US012746977B2

(12) United States Patent
Takemoto et al.

(10) Patent No.: US 12,746,977 B2
(45) Date of Patent: Sep. 29, 2026

(54) HOOD FOR VEHICLE

(71) Applicant: NISSAN MOTOR CO., LTD., Yokohama (JP)

(72) Inventors: Shinichiro Takemoto, Kanagawa (JP); Amane Shimoji, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 210 days.

(21) Appl. No.: 18/838,356

(22) PCT Filed: Feb. 15, 2022

(86) PCT No.: PCT/JP2022/005791
§ 371 (c)(1),
(2) Date: Aug. 14, 2024

(87) PCT Pub. No.: WO2023/157046
PCT Pub. Date: Aug. 24, 2023

(65) Prior Publication Data

US 2025/0136189 A1 May 1, 2025

(51) Int. Cl.
*B62D 25/00* (2006.01)
*B62D 25/10* (2006.01)
*B62D 29/00* (2006.01)

(52) U.S. Cl.
CPC ......... *B62D 25/105* (2013.01); *B62D 29/005* (2013.01)

(58) Field of Classification Search
CPC ............................ B62D 25/105; B62D 29/005
USPC .................................................... 296/193.11
See application file for complete search history.

(56) References Cited

U.S. PATENT DOCUMENTS 4,308,307 A 12/1981 Heath et al.
2008/0007094 A1 1/2008 Ishitobi
2008/0066983 A1 3/2008 Kimoto et al.
2015/0028624 A1* 1/2015 Wisniewski ......... B62D 25/105 296/187.03
2020/0361539 A1* 11/2020 Muhammad .............. B32B 7/12

FOREIGN PATENT DOCUMENTS

JP 2004-082796 A 3/2004

* cited by examiner

*Primary Examiner* — Steven O Douglas
(74) *Attorney, Agent, or Firm* — Foley & Lardner LLP

(57) ABSTRACT

A hood for a vehicle includes an outer panel that is made of metal and is convex upwardly, an inner panel that is made of metal and is disposed beneath the outer panel, and at least one wall member that is made of plastic and connects a bottom face of the outer panel to a top face of the inner panel. A width of a cross-bridge portion of the inner panel in a longitudinal direction of the vehicle is smaller than a length of the outer panel in the longitudinal direction. The cross-bridge portion extends straight in a lateral direction of the vehicle and is located beneath a front portion of the outer panel, and both ends thereof are joined to both side edges of the outer panel, respectively.

15 Claims, 3 Drawing Sheets

HOOD FOR VEHICLE

TECHNICAL FIELD

The present invention relates to a hood for a vehicle.

BACKGROUND ART

An engine/motor compartment at a front section of a vehicle is covered by a hood (bonnet). The hood is attached to a vehicle body by hinges. The hood generally has a double-plate structure with metal outer and inner panels in consideration of its rigidity and strength. Steel is commonly used as its metal, but aluminum alloys are sometimes used to reduce vehicle weight in order to improve vehicle dynamics and fuel economy. A hood made of FRP is also available but is not common. A Patent Literature 1 listed below discloses a hood for a vehicle that has a double-plate structure.

Many holes are formed on its inner panel to reduce the weight of the hood, but its size is the same as the size of its outer panel. By hemming the perimeter edges of the outer panel with the perimeter edges of the inner panel, the outer panel and the inner panel are secured to each other. Considering the appearance of the outer panel surface, the inner panel is not welded to the outer panel, but they are joined to each other face to face by forming a gap between them and filling the gap with a sealant. This three-dimensional structure ensures out-of-plane rigidity.

CITATION LIST

Patent Literature

Patent Literature 1: Japanese Patent Application Publication No. 2004-82796

SUMMARY OF INVENTION

Problem to be Solved

In a hybrid electric vehicle (HEV), an internal combustion engine (ICE) and a motor generator (MG) are installed in its compartment as well as an electronic control module, such as an inverter, and a transmission unit (transfer unit). Also in a battery electric vehicle having no ICE, an electronic control module and a transfer unit, which are mentioned above, are installed in its compartment in addition to a motor generator. The number of other supplemental devices also tends to increase, and there is a desire to expand the volume of said compartment. Here, a hood with a three-dimensional structure that requires height in the vertical direction inhibits expansion of the volume. In other words, there is a need to reduce the height of the hood in order to improve design flexibility.

On the other hand, there is another strong demand for a hood to be lightweight in order to reduce carbon dioxide emissions (i.e., improve fuel economy) in recent years. Furthermore, a hood needs to meet vehicle body performance requirements related to vehicle frontal collisions. Specifically, a hood is required to be bent at the middle in its longitudinal direction during a frontal collision (collision energy absorption and prevention of its intrusion into the passenger compartment). Therefore, the present invention is to provide a hood for a vehicle with a novel structure that improves design flexibility, reduces weight, and satisfies required frontal-collision performance.

Solution to Problem

A hood for a vehicle according to an aspect of the present invention includes an outer panel that is made of metal and is convex upwardly, an inner panel that is made of metal and is disposed beneath the outer panel, and at least one wall member that is made of plastic and connects a bottom face of the outer panel to a top face of the inner panel. A width of a cross-bridge portion of the inner panel in a longitudinal direction of the vehicle is smaller than a length of the outer panel in the longitudinal direction. The cross-bridge portion extends straight in a lateral direction of the vehicle and is located beneath a front portion of the outer panel, and both ends thereof are joined to both side edges of the outer panel, respectively.

Advantageous Effects

According to the aspect, improvement of design flexibility, weight reduction and required frontal-collision performance can be brought due to its novel structure.

DESCRIPTION OF EMBODIMENTS

Figure 1:
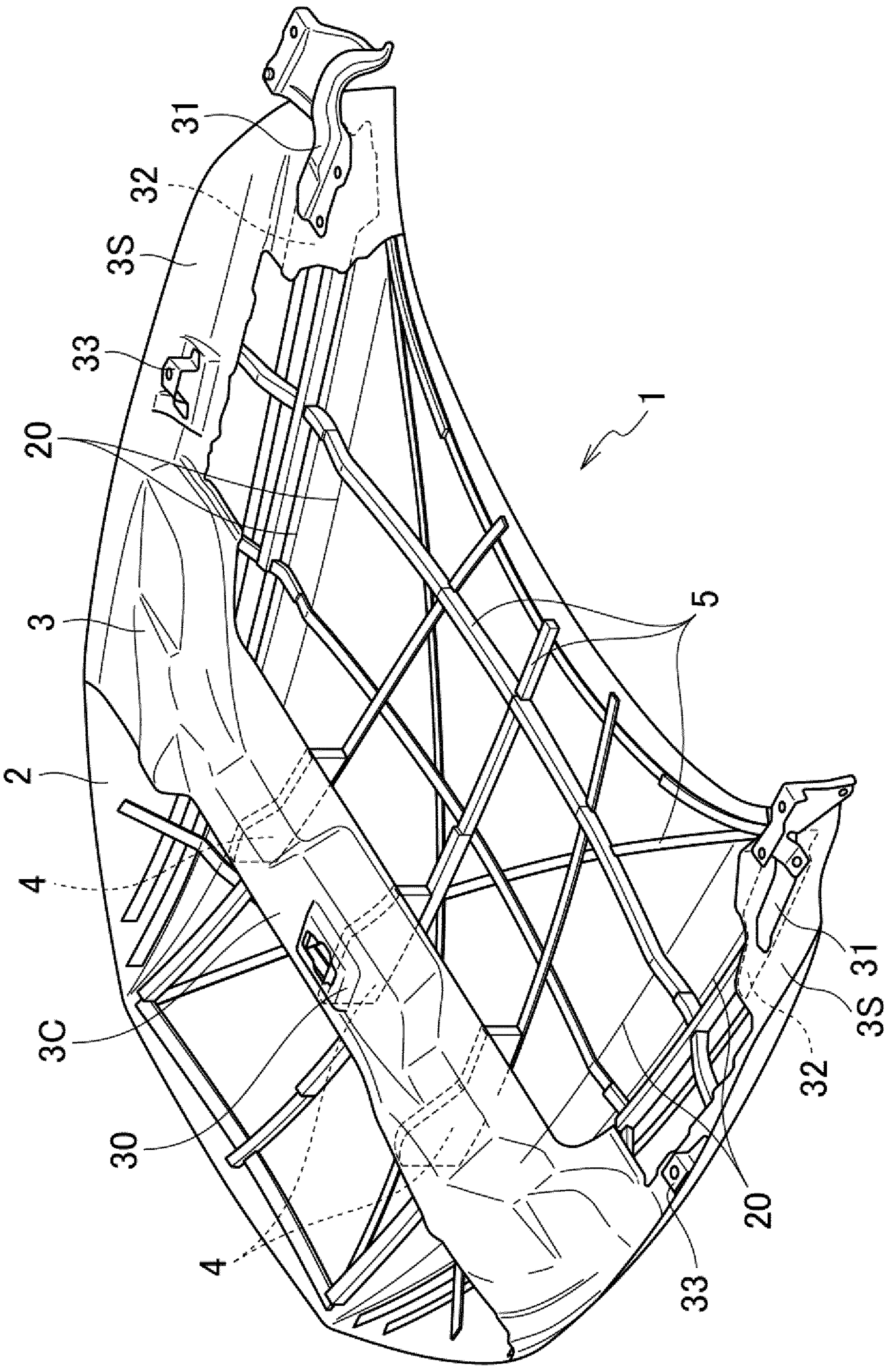
FIG. 1 is a perspective view showing a bottom face of a hood according to a first embodiment.
Figure 2:
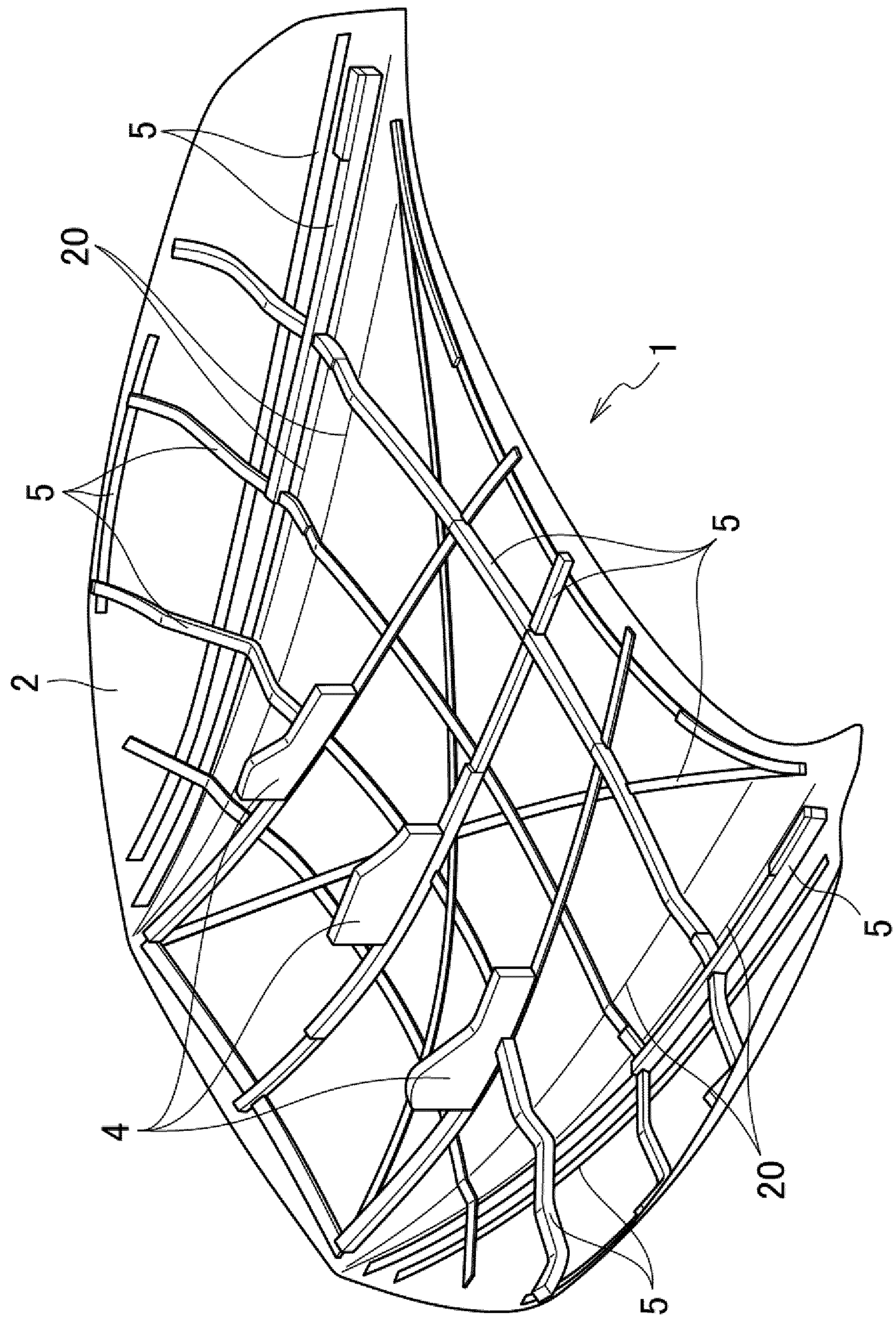
FIG. 2 is a perspective view showing a state where an inner panel is removed from the hood.

Hereinafter, a hood for a vehicle according to embodiments will be described with reference to the drawings. First, a hood 1 according to a first embodiment will be described with reference to FIG. 1 and FIG. 2. Note that FIG. 1 and FIG. 2 are perspective views in which the hood 1 is viewed from beneath with a bottom face of the hood 1 is oriented upward.

The hood 1 according to the first embodiment includes a metal outer panel 2 and a metal inner panel 3. The outer panel 2 and the inner panel 3 are directly joined at both ends in a lateral direction of a vehicle, but a gap is formed between them. The two panels are joined by pinching the side edges of the inner panel 3 when hemming the perimeter edges of the outer panel 2 (adhesives or sealants may be used in combination).

Wall members 4 made of plastic are provided in the above-mentioned gap, and the wall members 4 connect the bottom face of the outer panel 2 to the top face of the inner panel 3. Tape members 5 made of plastic are also attached to the bottom face of the outer panel 2 to improve the out-of-plane rigidity of the outer panel 2 (i.e., of the hood 1). The tape members 5 extend in the above-mentioned lateral direction, in a longitudinal direction which is approximately orthogonal to the lateral direction, and in diagonal directions each of which intersects both the longitudinal direction and the lateral direction. The above-mentioned wall members 4 are disposed on the tape members 5.

Each component will be described in more detail below.

The outer panel 2 in the present embodiment is made of steel or aluminum alloy. The outer panel 2 is manufactured from a metal sheet by press forming or incremental forming. The outer panel 2 is made convex upwardly. Undulations are also formed in the outer panel 2, and ridge lines and valley lines (so-called character lines 20) extend in the longitudinal direction. The character lines 20 give an aesthetic appearance to the hood 1 and improve the rigidity of the hood 1. Some of the above-mentioned tape members 5 extending in the longitudinal direction are attached to the bottom face of the outer panel 2 along these undulations (the character lines 20).

The inner panel 3 is also made of steel or aluminum alloy, and is generally made of the same material as the material of the outer panel 2. The inner panel 3 is also manufactured from a metal sheet by press forming or incremental forming. The inner panel 3 has a U-shape, including a cross-bridge portion 3C and a pair of side-extension portions 3S. The cross-bridge portion 3C extends almost straight in the lateral direction. The width of the cross-bridge section 3C in the longitudinal direction is smaller than the length of the outer panel 2 in the longitudinal direction. The cross-bridge section 3C is located beneath the front portion of the outer panel 2. In the center of the cross-bridge portion 3C, a locking portion 30 that engages a locking striker on a vehicle body is formed.

On the other hand, the side-extension portions 3S extend in the longitudinal direction. More particularly, the side-extension portions 3S extend rearward from the side ends of the cross-bridge portion 3C along the side edges of the outer panel 2, respectively. A hinge 31 for attaching the hood 1 to the vehicle body is attached to each rear end of the side-extension portions 3S by means of bolts and nuts. A reinforcement 32 is welded on the upper face of the rear end to ensure the mounting strength of the hinge 31. That is, the reinforcement 32, the inner panel 3 and the hinge 31 are jointly tightened by the bolts and the nuts welded on an upper face of the reinforcement 32. A bracket 33 for aligning the vertical position of the closed hood 1 with respect to the vehicle body is welded at the middle of the side-extension portion 3S in the longitudinal direction (a rubber bush attached to the bracket 33 is not shown in the drawings).

Since the outer panel 2 is convex upwardly and the cross-bridge portion 3C of the inner panel 3 extends straight, the gap is formed between them. The wall members 4 are attached in this gap to connect the bottom face of the outer panel 2 to the top face of the inner panel 3. In the present embodiment, three wall members 4 are provided on the left side, the center, and the right side in the lateral direction. The center wall member 4 is positioned at the location of the above-mentioned locking section 30. Each of the wall members 4 has a plate-wall shape extending in the longitudinal direction. The wall members 4 in the present embodiment are made of Carbon Fiber Reinforced Plastic (CFRP). The matrix resin of CFRP can be a thermosetting resin or a thermoplastic resin (CFRTP). The carbon fibers of CFRP (including CFRTP) in the present embodiment are continuous fibers, but may also be non-continuous fibers. Furthermore, the continuous carbon fibers are oriented in the longitudinal direction. The wall members 4 may be made of Fiber Reinforced Plastic (FRP) containing reinforcing fibers other than carbon fibers. As the reinforcing fibers, glass fibers, aramid fibers or the like can be adopted. The wall members 4 do not have to contain reinforcing fibers as long as they are made of plastic.

In the present embodiment, each of the tape members 5 is also made of CFRP. And its carbon fibers are continuous fibers and oriented in the extending direction of the tape members 5. Also here, the matrix resin of CFRP may be thermosetting resin or thermoplastic resin, and the carbon fibers may be continuous or non-continuous fibers. In the present embodiment, the matrix resin is a thermoplastic resin and continuous carbon fibers are used. The tape members 5 may be made of FRP containing reinforcing fibers other than carbon fibers, or may not have to contain reinforcing fibers as long as they are made of plastic.

The tape members 5 in the present embodiment are formed by laminating a thin CFRTP tape material (30 mm wide and 0.2 mm thick) multiple times. The height (thickness) of the tape member 5 is adjusted according to the number of lamination times. By increasing the height of the tape member 5, the rigidity of the outer panel 2 can be increased. The height of the tape member 5 is adjusted according to the rigidity required at the position where it is provided. In the present embodiment, the height of the tape member 5 between the outer panel 2 and the above-mentioned reinforcement 32 is made large, and the tape member 5 connects the bottom face of the outer panel 2 to the top face of the reinforcement 32 to improve the strength of the attachment portion of the hinge 31.

In the present embodiment, the tape member 5 is formed by stacking the above-mentioned tape materials by an NC-controlled automatic laminating device. The automatic laminating device impregnates the carbon fibers, which are continuous fiber, with melted thermoplastic resin while extruding it in tape form from a nozzle located at the tip of a robot arm. The extruded tape material is laminated on the bottom face of the outer panel 2 oriented upward and then cured as its temperature drops to be fixed on the outer panel 2 as the tape member 5. At this time, a surface treatment is applied in advance on the bottom face of the outer panel 2 to improve the fixing strength of the tape member 5. The surface treatment is done by laser processing or chemical treatment. These surface treatments form micro asperity, and the resin enters into the micro asperity to develop an anchoring effect. Silane coupling may also be used as the surface treatment.

However, the method of forming the tape member 5 is not limited to the above method. The tape material 5, which has been adjusted to the desired height in advance, may be attached to the bottom face of the outer panel 2 automatically or manually. The tape member 5 may also be formed by laminating tape materials using thermosetting resin instead of thermoplastic resin with the above-mentioned automatic laminating device. The tape member 5 may be fixed on the bottom face of the outer panel 2 by an adhesive or sealant. Alternatively, the tape member 5 may be previously molded using a molding machine capable of injection molding a tape with varying molding height, and then the tape member 5 may be fixed on the bottom face of the outer panel 2.

As described above, in the present embodiment, the wall member 4 is formed by further laminating the above tape materials continuously after the tape member 5 is laminated on the bottom face of the outer panel 2. In the present embodiment, the wall member 4 is formed by further laminating 100 to 200 layers of the tape materials on the tape member 5 using the above-mentioned automatic laminating device. However, the method of forming the wall member 4 is not limited to this method. The wall member 4 previously made may be adhered onto the tape member 5. The tape materials may also be laminated using thermosetting resin instead of thermoplastic resin by using the above-mentioned automatic laminating device. The wall member 4 may be fixed on the tape material 5 by means of an adhesive or sealant. Alternatively, the wall member 4 may be previously molded and then fixed on the tape member 5.

In the present embodiment, the wall member 4 is provided together with the tape member 5. However, the wall member 4 may be fixed directly on the bottom face of the outer panel 2 without the tape member 5 interposed. In this case, the method similar to the above-mentioned method of fixing the tape member 5 on the bottom face of the outer panel 2 can be adopted as the method of fixing the wall member 4 on the bottom face of the outer panel 2. Of course, the wall member 4 can be formed directly on the bottom face of the outer panel 2 by laminating the tape materials using the above-mentioned automatic laminating device. Alternatively, the wall member 4 may be formed by fabricating a filament made by impregnating continuous carbon fibers with resin by use of a 3D printer (CFRP-FMD method: Fused Deposition Modeling).

Note that the structure shown in FIG. 1 is constructed before the hood 1 is painted in the present embodiment. This process is preferable in consideration of the joint strength between the wall member 4 and the tape member 5, and the outer panel 2 and the inner panel 3. However, the wall members 4 and the tape members 5 may be fixed on the surface of the outer panel 2 and the inner panel 3 after the outer panel 2 and the inner panel 3 are painted.

The wall members 4 and the tape members 5 are formed of thermoplastic resin (CFRTP) in the present embodiment. In this case, the inner panel 3 is fixed on the wall members 4 with adhesive or sealant after forming the wall members 4 and the tape members 5 on the bottom face of the outer panel 2 as described above. At the same time, the reinforcements 32 are also fixed to the ends of the tape members 5 by adhesive or sealant. Then, the both ends of the cross-bridge portion 3C of the inner panel 3 (and the side edges of the side-extension portion 3S) are joined with the perimeter edges of the outer panel 2, respectively, by hemming the perimeter edges of the outer panel 2.

On the other hand, in a case where the wall members 4 and the tape members 5 are formed with CFRP of thermosetting resin, the wall members 4 and the tape members 5 are formed on the bottom face of the outer panel 2 with pre-cured prepreg, and then the inner panel 3 with the reinforcements 32 welded thereon is placed on the wall members 4. Then, the prepreg is cured in an oven or the like. The thermosetting resin (matrix resin), which softens once before curing, enters into the micro asperity made by the surface treatment of the outer panel 2 and the inner panel 3 to develops the anchoring effect after curing. The perimeter edge of the outer panel 2 may be hemmed before or after the prepreg is cured.

According to the present embodiment, the width of the cross-bridge portion 3C of the inner panel 3 in the longitudinal direction is smaller than the length of the outer panel 2 in the longitudinal direction, and the cross-bridge portion 3C is located beneath the front portion of the outer panel 2. In addition, both ends of the cross-bridge portion 3C are joined to both side edges of the outer panel 2, respectively. Furthermore, the bottom face of the outer panel 2 and the top face of the inner panel 3 are connected by the wall members 4 made of plastic. Since the outer panel 2, the inner panel 3 and the wall members 4 form a three-dimensional closed-cross-section structure, the out-of-plane rigidity, the torsional rigidity and the bending rigidity of the hood 1 can be ensured. In addition, since the size of the metal inner panel 3 is made small, the weight of the hood 1 can be reduced. Although the size of the inner panel 3 is small, the above-mentioned rigidities can be ensured due to the existence of the wall members 4.

In addition, the cross-bridge portion 3C of the inner panel 3 is located beneath the front portion of the outer panel 2. This allows the volume of the rear space in the engine/motor compartment to be expanded, and thereby the design flexibility of the various units in the compartment can be enhanced. Furthermore, the modeling flexibility of the hood 1 itself can also be enhanced. Furthermore, pedestrian protection performance can be improved by leaving the upper rear space in the compartment. Furthermore, in the event of a vehicle frontal collision, the impact load is input to the front end of the outer panel 2, but the load can also be received by the inner panel 3 while mitigating the stress through the wall members 4. In this case, the hood 1 can be bent at the low-strength portion behind the cross-bridge portion 3C, i.e., at the middle of the hood 1 in the longitudinal direction. As a result, the required frontal-collision performance can also be satisfied.

In addition, according to the present embodiment, the inner panel 3 also has a pair of the side-extension portions 3S extending from both ends of the cross-bridge portion 3C along both side edges of the outer panel 2, respectively. That is, the inner panel 3 as a whole has a U-shape having a size smaller than that of the outer panel 2. This further improves the rigidity of the hood 1 while reducing the weight of the hood 1 as described above. Even though the inner panel 3 has such a U-shape, the side-extension portions 3S do not obstruct the volume expansion of the rear space in the compartment described above. Therefore, the above-mentioned enhancements in the design flexibility and the modeling flexibility are not inhibited. Furthermore, it is possible to provide the attachment portions of the hinges 31 at the rear ends of the side-extension portions 3S, which are required to have sufficient strength.

In addition, according to the present embodiment, the plural plastic tape members 5 are also extended on the bottom face of the outer panel 2. This further improves the rigidity of the hood 1. If metal members are welded to the bottom face of the outer panel 2 to reinforce it, weld marks will appear on the top face of the outer panel 2 or the outer panel 2 will be distorted by heat. In a case where the plastic tape members 5 are fixed on the bottom face of the outer panel 2, the appearance of the outer panel 2 will not be disturbed. Also, the plastic tape members 5 are small in weight and do not hinder the weight reduction. The inner panel 3 would rather be made smaller by providing the tape members 5, and further weight reduction is possible. Furthermore, the tape members 5 can flex and deform under large loads and thus do not deteriorate pedestrian protection performance. Rather, it is easier to balance the rigidity of the hood 1 with the pedestrian protection performance. Furthermore, in the event of a frontal collision, they can improve collision energy absorption of the hood 1.

Here, according to the present embodiment, the tape members 5 are formed of carbon fiber reinforced plastic (CFRP). And the carbon fibers of the carbon fiber reinforced plastic are continuous fibers, and the continuous fibers are oriented in the extending direction of the tape member 5. CFRP is lightweight but has high rigidity, and thereby it can facilitate further weight reduction. In addition, the height of the tape member 5 can be reduced compared to forming the tape member 5 using only plastic, and thus the compartment volume can be further expanded. As a result, the design flexibility and the modeling flexibility can be further improved. Furthermore, it becomes easier to ensure the rigidity of the hood 1 by orienting the continuous carbon fibers in the extending direction.

If the tape members 5 are extended in the longitudinal direction, it is preferable for satisfying the above-mentioned required performance against a frontal collision. Furthermore, if the tape members 5 are also extended in the lateral direction and thus the tape members 5 are arranged in a grid pattern, the rigidity of the hood 1 can be effectively secured. In addition, since the rigidity of the hood 1 can be totally improved, its further weight reduction can be done by reducing the thickness of the outer panel 2.

In addition to the above-mentioned grid arrangement, the rigidity of the hood 1 can be more effectively secured when the tape members 5 are also extended in the diagonal directions. In particular, it can effectively resist local bending and twisting. Note that, particularly in the present embodiment, the two tape members 5 extending in the diagonal directions are located above (beneath in the drawings) a locking portion 30. This makes it possible for the tape members 5 and the outer panel 2 to also receive the load input to the locking portion 30 of the inner panel 3 via the central wall member 4 when the hood 1 is closed.

In addition to the above-mentioned grid arrangement, the rigidity of the hood 1 can be more effectively secured when the tape member 5 is also extended along the perimeter edges of the outer panel 2. In particular, the perimeter edges of the outer panel 2 are prone to stress and deformation when a load applies thereto. Therefore, the outer panel 2 can be protected by extending the tape members 5 along the perimeter edges. In the present embodiment, unlike conventional hoods, there are perimeter edges of the outer panel 2 that are not joined to the inner panel 3 (e.g., its front and rear edges), so it is effective to extend the tape members 5 along the perimeter edges.

In addition to the above-mentioned grid arrangement, the rigidity of the hood 1 can be more effectively secured when the tape members 5 are also extended along the undulations (the ridge or valley lines: the character lines 20) of the outer panel 2. In addition, the position and shape of the undulations may be sometimes limited due to restrictions on the rigidity and the strength required for the hood 1. However, since the rigidity and the strength can be secured by the tape members 5, the forming flexibility of the undulations on the outer panel 2 can be enhanced. As a result, the design flexibility and the modeling flexibility can be further improved.

According to the present embodiment, the wall member 4 has a plate-wall shape extending long in the longitudinal direction, and it is preferable for satisfying the above-mentioned required frontal-collision performance. The impact load input to the front end of the outer panel 2 during a frontal collision can be transmitted to the inner panel 3 while mitigating the stress through the wall members 4. In addition, the wall members 4, which extend in the longitudinal direction, are less likely to fall down in the longitudinal direction, and thereby it becomes easier to bend the hood 1 at the middle of the hood 1 in the longitudinal direction. Furthermore, the outer panel 2 can also receive the load input to the inner panel 3 via the wall members 4 when the hood 1 is closed.

Here, according to the present embodiment, the wall members 4 are formed of carbon fiber reinforced plastic (CFRP). And the carbon fibers of the carbon fiber reinforced plastic are continuous fibers, and the continuous fibers are oriented in the extending direction of the wall member 4. CFRP is lightweight but has high rigidity, and thereby it facilitates further weight reduction. In addition, the height of the wall member 4 can be reduced compared to forming the wall member 4 using only plastic, and thus the volume beneath the cross-bridge portion 3C, i.e., the volume of the front side of the compartment, can be expanded. As a result, the design flexibility and the modeling flexibility can be further improved. Furthermore, it is easier to ensure the rigidity of the hood 1 by orienting the continuous carbon fibers in the extending direction.

Especially according to the present embodiment, the CFRP wall members 4 extending in the longitudinal direction are formed on the CFRP tape members 5 extending in the longitudinal direction. And their continuous carbon fibers are oriented in the extending direction. Therefore, the above-mentioned advantages brought by the CFRP tape members 5 including the continuous carbon fibers and the above-mentioned advantages brought by the CFRP wall members 4 including the continuous carbon fibers can be realized synergistically. In addition, especially in the present embodiment, since the wall members 4 and the tape members 5 are formed by laminating the tape materials and thus these members can be formed continuously, both the manufacturing equipment and the manufacturing process can be simplified.

Figure 3:
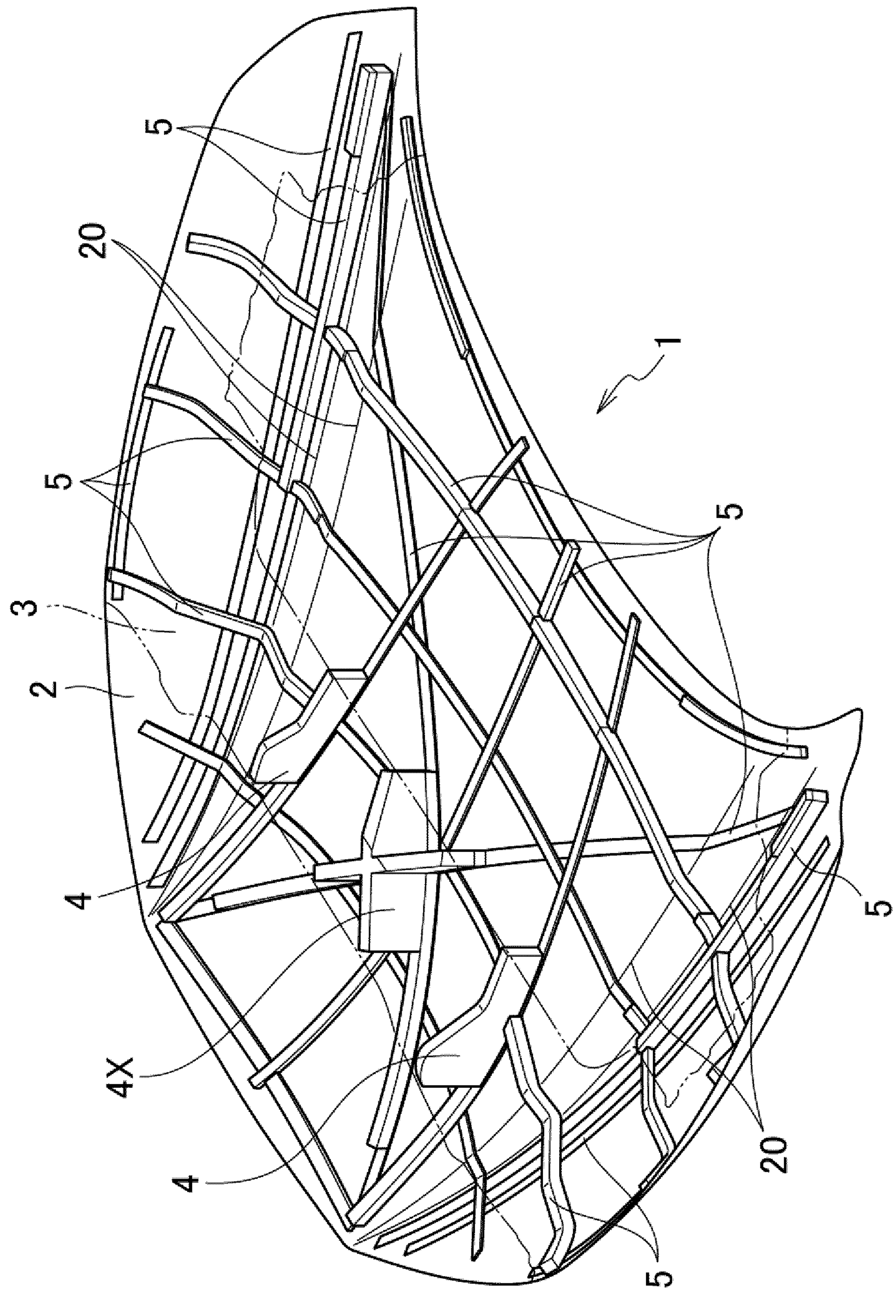
FIG. 3 is a perspective view showing a bottom face of a hood according to a second embodiment in a state where its inner panel is removed therefrom.

Next, a hood 1 according to a second embodiment will be described with reference to FIG. 3. In the present embodiment, its central wall member 4X has a cross-wall shape formed by two plate-walls extending long in the diagonal directions each of which intersects both the lateral direction and the longitudinal direction, instead of the plate-wall shape extending long in the longitudinal direction in the first embodiment. Other configurations are similar to those in the hood 1 of the first embodiment. Therefore, identical and equivalent configurations are labelled with the identical numbers and their detailed descriptions will be omitted.

The wall member 4X is located beneath the locking portion 30 of the inner panel 3 and is formed on the intersection point of the tape members 5 extended in the diagonal directions. Both the wall member 4X and the tape members 5 are made of CFRTP, and their continuous carbon fibers are oriented in the extending direction. The method of forming the wall member 4X and fixing it to the outer panel 2 and the inner panel 3 is the same as that in the first embodiment. Since the left and right wall members 4 also extend in the longitudinal direction in this embodiment, the above-mentioned advantages of the first embodiment can be also brought by the present embodiment.

Furthermore, according to the present embodiment, the wall member 4X is also formed in the above-mentioned cross-wall shape. Also with the wall member 4X like this, the impact load input to the front end of the outer panel 2 during a frontal collision can be transmitted to the inner panel 3 via the wall member 4X (and the wall members 4) while mitigating the stress. In addition, the wall member 4X has the cross-wall shape and is less likely to fall down in the longitudinal direction, and thereby it becomes easier to bend the hood 1 in the middle of the hood 1 in the longitudinal direction. Furthermore, the outer panel 2 can also receive the load input to the inner panel 3 via the wall member 4X (and the wall members 4) when the hood 1 is closed.

Furthermore, since the wall member 4X has the cross-wall shape, the hood 1 can more effectively resist its torsional deformation. In addition, the wall member 4X has two plate-walls extending in the diagonal directions, and it can contribute to improving the rigidity in the diagonal directions. Furthermore, since the two plate-walls form the cross-wall shape, it can contribute to improving the rigidity not only in the diagonal directions but also in the longitudinal direction and the lateral direction. Especially according to the present embodiment, the wall member 4X is located above (beneath in the drawings) the locking portion 30, and this makes it possible for the tape members 5 and the outer panel 2 to also receive the load input to the locking portion 30 of the inner panel 3 via the wall member 4X when the hood 1 is closed.

Here, according to the present embodiment, the wall member 4X is formed of carbon fiber reinforced plastic (CFRP). And the carbon fibers of the carbon fiber reinforced plastic are continuous fibers, and the continuous fibers are oriented in the extending direction of the wall member 4X. CFRP is lightweight but has high rigidity, and thereby it facilitates further weight reduction. In addition, the height of the wall member 4X can be reduced compared to forming the wall member 4X using only plastic, and thus the volume beneath the cross-bridge portion 3C, i.e., the volume of the front side of the compartment, can be expanded. As a result, the design flexibility and the modeling flexibility can be further improved. Furthermore, it is easier to ensure the rigidity of the hood 1 by orienting the continuous carbon fibers in the extending direction.

In addition, especially according to the present embodiment, the wall member 4X extending the diagonal directions is formed on the CFRP tape members 5 extending in the diagonal directions. And its continuous carbon fibers are oriented in the extending directions. Therefore, the above-mentioned advantage brought by the CFRP tape members 5 including the continuous carbon fibers and the above-mentioned advantages brought by the CFRP wall member 4X including the continuous carbon fibers can be realized synergistically. In addition, especially in the present embodiment, since the wall members 4 and the tape members 5 are formed by laminating the tape materials and thus these members can be formed continuously, both the manufacturing equipment and the manufacturing process can be simplified.

The present invention is not limited to the above-mentioned embodiments. For example, the wall member 4 in the above embodiments has a shape long in the longitudinal direction, but each may have a columnar shape with a short length in the longitudinal direction. Alternatively, the wall member 4 may have a circular or polygonal hollow cylindrical wall shape (like a tower shape). The wall member 4 may have a solid cylindrical shape instead of the hollow cylindrical shape. In addition, the inner panel 3 in the above embodiment has the U-shape with the cross-bridge portion 3C and the side-extension portions 3S. The side-extension portion 3S may be also extended further forward than the cross-bridge portion 3C, in which case the inner panel 3 has an H-shape. That is, this H shape is one of variations of the U-shape.

REFERENCE SIGNS LIST

1 hood
2 outer panel
20 character line (undulation of the outer panel 2)
3 inner panel
3C cross-bridge portion
3S side-extension portion
4, 4X wall member
5 tape member

The invention claimed is:

1. A hood for a vehicle, comprising:
an outer panel that is made of metal and is convex upwardly;
an inner panel that is made of metal and is disposed beneath the outer panel; and
at least one wall member that is made of plastic and connects a bottom face of the outer panel to a top face of the inner panel,
wherein the inner panel has a cross-bridge portion whose width in a longitudinal direction of the vehicle is smaller than a length of the outer panel in the longitudinal direction, and
wherein the cross-bridge portion extends straight in a lateral direction of the vehicle and is located beneath a front portion of the outer panel, and both ends of the cross-bridge portion are joined to both side edges of the outer panel, respectively.

2. The hood for the vehicle, according to claim 1,
wherein the inner panel also has a pair of side-extension portions that extend along the both side edges of the outer panel from both ends of the cross-bridge portion, respectively, to have a U-shape whose size is smaller than a size of the outer panel.

3. The hood for the vehicle, according to claim 1, further comprising
a plurality of tape members that are made of plastic and extend on the bottom face of the outer panel.

4. The hood for the vehicle, according to claim 3,
wherein the tape members are made of carbon fiber reinforced plastic,
wherein carbon fibers of the carbon fiber reinforced plastic are continuous fibers, and
wherein the continuous fibers are oriented in each extending direction of the tape members.

5. The hood for the vehicle, according to claim 4,
wherein the tape members are extended in the longitudinal direction.

6. The hood for the vehicle, according to claim 5,
wherein the tape members are also extended in the lateral direction, and the tape members are arranged in a grid pattern.

7. The hood for the vehicle, according to claim 6,
wherein the tape members are also extended in a diagonal direction that intersects both the longitudinal direction and the lateral direction.

8. The hood for the vehicle, according to claim 6,
wherein the tape members are also extended along a perimeter edge of the outer panel.

9. The hood for the vehicle, according to claim 6,
wherein the tape members are also extended along an undulation of the outer panel.

10. The hood for the vehicle, according to claim 1,
wherein the wall member has a plate-wall shape extending long in the longitudinal direction.

11. The hood for the vehicle, according to claim 10,
wherein the wall member is made of carbon fiber reinforced plastic,
wherein carbon fibers of the carbon fiber reinforced plastic are continuous fibers, and
wherein the continuous fibers are oriented in an extending direction of the wall member.

12. The hood for the vehicle, according to claim 5,
wherein the wall member has a plate-wall shape extending long in the longitudinal direction and formed on the tape members,
wherein the wall member is formed of carbon fiber reinforced plastic,
wherein carbon fibers of the carbon fiber reinforced plastic are continuous fibers, and wherein the continuous fibers are oriented in an extending direction of the wall member.

13. The hood for the vehicle, according to claim 1, wherein the wall member has a cross-wall shape formed by two plate walls extending in diagonal directions each of which intersects both the lateral direction and the longitudinal direction.

14. The hood for the vehicle, according to claim 13, wherein the wall member is formed of carbon fiber reinforced plastic, wherein carbon fibers of the carbon fiber reinforced plastic are continuous fibers, and wherein the continuous fibers are oriented in extending directions of the wall member.

15. The hood for the vehicle, according to claim 7, wherein the wall member has a cross-wall shape formed by two plate walls extending in diagonal directions each of which intersects both the lateral direction and the longitudinal direction, wherein the wall member is formed of carbon fiber reinforced plastic, wherein carbon fibers of the carbon fiber reinforced plastic are continuous fibers, and wherein the continuous fibers are oriented in extending directions of the wall member.

* * * * *